US009251249B2

(12) United States Patent
Dmitriev et al.

(10) Patent No.: US 9,251,249 B2
(45) Date of Patent: Feb. 2, 2016

(54) ENTITY SUMMARIZATION AND COMPARISON

(75) Inventors: Pavel Dmitriev, Bellevue, WA (US); Wei Zhuang, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/316,838

(22) Filed: Dec. 12, 2011

(65) Prior Publication Data

US 2013/0151538 A1    Jun. 13, 2013

(51) Int. Cl.
*G06F 17/30* (2006.01)

(52) U.S. Cl.
CPC .... *G06F 17/30616* (2013.01); *G06F 17/30687* (2013.01)

(58) Field of Classification Search
CPC ................................................. G06F 17/30616
USPC .............................. 707/723, 726; 13/723, 726
See application file for complete search history.

(56) References Cited

U.S. PATENT DOCUMENTS

| 7,970,808 | B2 * | 6/2011 | Konig et al. ................. 707/962 |
| 8,346,795 | B2 * | 1/2013 | Roulland et al. ............. 707/766 |
| 8,402,031 | B2 * | 3/2013 | Govani et al. ................ 707/748 |
| 8,417,713 | B1 * | 4/2013 | Blair-Goldensohn et al. ............................. 707/751 |
| 8,589,399 | B1 * | 11/2013 | Lee et al. ..................... 707/737 |
| 2004/0167888 | A1 * | 8/2004 | Kayahara et al. ................ 707/3 |
| 2009/0193328 | A1 | 7/2009 | Reis et al. |
| 2010/0185642 | A1 * | 7/2010 | Higgins ............ G06F 17/30867 707/758 |
| 2011/0004618 | A1 * | 1/2011 | Chaudhary ....... G06F 17/30864 707/769 |
| 2011/0072052 | A1 * | 3/2011 | Skarin ..................... G06Q 10/10 707/794 |
| 2011/0078162 | A1 | 3/2011 | Nie et al. |
| 2011/0106807 | A1 * | 5/2011 | Srihari .............. G06F 17/30604 707/739 |
| 2011/0302179 | A1 * | 12/2011 | Agrawal ........... G06F 17/30616 707/754 |
| 2013/0159331 | A1 * | 6/2013 | Zhang .......................... 707/758 |

OTHER PUBLICATIONS

Demartini, et al., "Entity Summarization of News Articles", Retrieved at <<http://research.yahoo.com/files/p795-demartini.pdf>>, Proceedings of the 33rd international ACM SIGIR conference on Research and development in information retrieval, Jul. 19-23, 2010, pp. 795-796.

(Continued)

*Primary Examiner* — William Spieler
(74) *Attorney, Agent, or Firm* — Dave Ream; Danielle Johnston-Holmes; Micky Minhas

(57) ABSTRACT

An entity summarization system is described herein that mines the Internet and other data source to provide answers to questions such as the relative sentiment of users towards various brands. The system uses a controlled vocabulary list describing a specific aspect of entities of interest. Given an entity name, the system scans the whole content corpus to collect statistics on the words that occur most frequently in the context of the entity name, taking into account proximity information, to produce a weighted list of vocabulary terms describing the entity. Two entities can be compared by normalizing and comparing their weighted term lists. In some embodiments, the system performs these procedures efficiently by leveraging an N-gram web model. Thus, the system provides an automated way to compare two entities to derive information about how users feel about the entities at any given time.

14 Claims, 5 Drawing Sheets

(56) References Cited

OTHER PUBLICATIONS

Sydow, et al., "Entity Summarisation with Limited Edge Budget on Knowledge Graphs graphs", Retrieved at <<http://ieeexplore.ieee.org/stamp/stamp.jsp?tp=&arnumber=5679746>>, Proceedings of the International Multiconference on Computer Science and Information Technology (IMCSIT), vol. 5, Oct. 18-20, 2010, pp. 513-516.

Hand, Jeff, "Feasibility of Using Citations as Document Summaries", Retrieved at <<http://citeseerx.ist.psu.edu/viewdoc/download?doi=10.1.1.91.7950&rep=rep1&type=pdf>>, Information science Content analysis (Communication), Dec. 2003, pp. 247.

"EntityCube", Retrieved at <<http://research.microsoft.com/en-us/projects/entitycube/>>, Retrieved Date: Jun. 3, 2011, pp. 3.

"Producing Concise and Coherent Entity Description Summaries from Multiple Documents", Retrieved at <<http://www4.comp.polyu.edu.hk/~cswjli/Record_521105E.pdf>>, Retrieved Date: Jun. 2, 2011, pp. 5.

* cited by examiner

ENTITY SUMMARIZATION AND COMPARISON

BACKGROUND

The Internet provides access to a vast amount of information. A major challenge given the quantity of information is how to find and discover information to provide a user with the most relevant information for a particular circumstance. The most common tool for doing this today is a keyword based search query provided to a search engine. The search engine matches received keywords to one or more words or phrases in a search index to identify documents, web pages, or other content that is potentially relevant to the user's query. For example, if a user searches for "dinosaurs" then the search engine provides the user a list of search results that are links to web pages that contain that term.

User queries often contain one or more entities (e.g., a person, location, or organization name) identified by name or properties associated with the entity. For example, one query might search for "Barack Obama", while another might search for "President of the United States". Both of these queries are looking for information related to a specific entity. Users may also search for locations, such as restaurants, banks, shopping centers, and so forth. Entities may include any type of nameable thing whether it is a business, person, consumer good, service, and so forth.

Understanding how people feel about an entity (brand, product, person, business, etc.), finding out what are the most distinctive characteristics of this entity, and comparing two entities to understand the main differences are among the most common tasks people do on the Web. These tasks are very common for individuals, but they are also extremely important for businesses. Businesses spend a lot of effort and money trying to understand how people feel about their brands and products relative to their competitors. The World Wide Web contains lots of data with answers to these questions, but finding, filtering, and summarizing the web data to obtain these answers is challenging. Web data is often noisy and customer opinions about products may be distributed all over the Internet in a format and language that is difficult for automated tools to consume. There are web sites that ask users to provide reviews on entities and then display the reviews users entered (e.g., yelp.com, epinions.com), but these do not provide any reliable way to summarize and use this information in an automated fashion. Opinion mining is an active research area in Natural Language Processing (NLP). The goal there is to perform linguistic analysis of a piece of content (e.g., a product review) to understand the opinion of the author about it. However, this type of research is in its infancy and there is still far to go to get these processes to produce automatable results.

SUMMARY

An entity summarization system is described herein that mines the Internet and other data source to provide answers to questions such as the relative sentiment of users towards various brands. The system uses a controlled vocabulary list describing a specific aspect of entities of interest. Given an entity name, the system scans the content corpus to collect statistics on the words from the vocabulary list that occur most frequently in the context of the entity name, taking into account proximity information, to produce a weighted list of vocabulary terms describing the entity. Two entities can be compared by normalizing and comparing their weighted term lists. In some embodiments, the system performs these procedures efficiently by leveraging an N-gram web model. The system can also apply to the data gathered from a search engine query log and toolbar query logs from search toolbars built into applications and web browsers. This information allows efficient summarization of the sentiment-based words associated with an entity and summarizations of two entities can be efficiently compared to determine a relative sentiment of the two entities. Thus, the entity summarization system provides an automated way to compare two entities to derive information about how users feel about the entities at any given time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
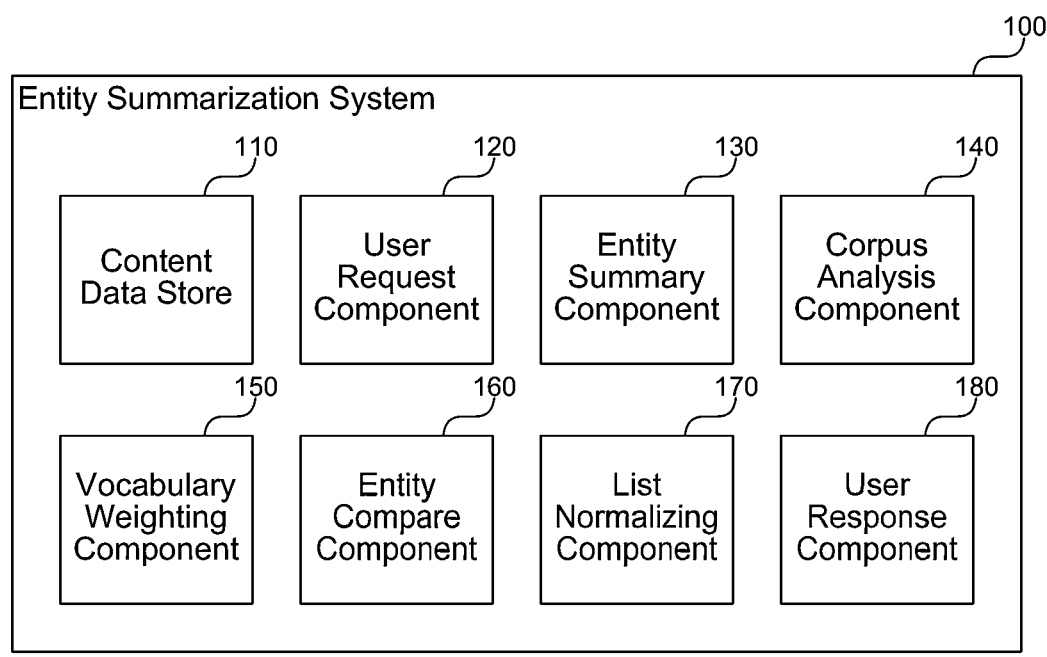
FIG. 1 is a block diagram that illustrates components of the entity summarization system, in one embodiment.

An entity summarization system is described herein that mines the Internet and other data source to provide answers to questions such as the relative sentiment of users towards various brands. For example, the maker of Coca-Cola may want to determine broad user sentiment about Coke vs. Pepsi, or the maker of Honda automobiles might want to determine broad user sentiment about Honda vs. Toyota vs. Ford. The entity summarization system uses a controlled vocabulary list describing a specific aspect of entities of interest (e.g., words describing people's feelings, words describing characteristics of cars, and so forth). Given an entity name, the system scans the whole content corpus (e.g., via an index crawled from Internet content) to collect statistics on the words that occur most frequently in the context of the entity name, taking into account proximity information, to produce a weighted list of vocabulary terms describing the entity. Two entities can be compared by normalizing and comparing their weighted term lists.

In some embodiments, the system performs these procedures efficiently by leveraging an N-gram web model. An N-gram model is a statistical language model to describe natural languages that contains subsequences of N items from a given sequence (where the items can be words, syllables, etc.). It is based on the statistics of words and word combinations, and uses a smoothing algorithm to obtain a probabilistic model. N is the order of the N-gram model, which means the largest length considered for each word. The entity summarization system applies an N-gram model (e.g., up to 5-gram in one implementation) from an entire index snapshot for web document body, title and anchor text. The system can also apply data gathered from a search engine query log and toolbar query logs from search toolbars built into applications and web browsers. This information allows efficient summarization of the sentiment-based words associated with an entity and summarizations of two entities can be efficiently compared to determine a relative sentiment of the two entities. Thus, the entity summarization system provides an automated way to compare two entities to derive information about how users feel about the entities at any given time.

For the entity summarization scenario, the input to the system is an entity name and a vocabulary containing the list of terms describing the aspect of the entities in which the requestor is interested. For example, the vocabulary may contain people feeling words if the requestor is interested in knowing how people feel about the entity or words describing different aspects of a restaurant business if the entity is a restaurant name and the requestor is interested in knowing what the most prominent characteristics of the restaurant are. The vocabulary can be either pre-defined or provided by the requestor. Given the input, the system performs matching of the entity name and the vocabulary terms to the content of web pages or other stored content, computing statistics on the occurrences of vocabulary terms in the context of the given entity name. The closer the entity name and a vocabulary term occur in the text, the higher the weight of the match. The result of this step is a weighted list of vocabulary terms describing the entity.

There are several advantages of using controlled vocabulary to perform entity summarization over previous approaches. First, any type and aspect of entities can be summarized using this approach. In contrast, opinion-mining systems are limited to mining people's opinions. Second, the entity summarization system can use content from the whole web. In contrast, opinion mining systems can only analyze a small amount of text (due to computational complexity of linguistic analysis), and review sites are limited to the content from their own site (and perhaps a few more sites with which they collaborate). Entity summarization in general is a very hard problem because it is not clear what aspect of the entity the user would be interested in, and what are the words that appropriately describe that aspect. Opinion mining systems suffer from this problem, and review sites typically do not even attempt to summarize their reviews. By providing vocabulary as an input, the entity summarization system addresses both of the above issues in an easy and elegant way. In contrast to the review sites and search engines that simply provide a list or reviews or web pages about an entity, this system summarizes all the content and presents it in a compact, user-friendly way (e.g., as a ranked list of terms or a tag cloud).

The system efficiently implements the above process to allow for real-time summarization of entities. Simply going through every page of the web and finding co-occurrences of the entity name and a vocabulary word and measuring distance between them would take hours, maybe even days. In order to implement the process efficiently, in some embodiments the system applies an N-gram web model. The N-gram web model represents all the content on the web as a set of n-grams—sequences of consecutive N words. This is done by pre-processing the whole web corpus, and creating an N-gram data store, containing a (N-gram, frequency) pair for each N-gram appearing on the web, as well as an index that, similar to a regular search engine index, allows retrieving all the N-grams containing a given set of one or more words. This representation is much more compact than the regular web corpus, since many N-grams repeat very frequently on the web. Any N≥2 can be used (e.g., in experiments N=5 worked well, but other values may be chosen in any particular implementation).

In some embodiments, to obtain the weighted list of vocabulary terms for a specific entity name, the system issues two queries (q1=<"entity name", "vocabulary term">, q2=<"vocabulary term">) to the index and computes the weight of the vocabulary term as weight(vocabulary term)= numResults(q1)/numResults(q2). This way of computing the weights has several advantages. First, it can be done efficiently as discussed above, Second, it is easily parallelizable (computation for any term can be done independently), and Third, it naturally accounts for proximity of terms—the closer the entity name and the vocabulary term are in a given document, the more N-grams they will appear in, and therefore the higher the contribution to the weight will be. Once the system has produced the weighted vocabulary list, the system can display the list to the user or use the list for further operations (such as entity comparison).

The comparison scenario follows a similar workflow, with addition of one more procedure at the end of the process. Once the weighted term lists for both entities are computed in the way described above, a comparison of the two entities is generated. The aim of the comparison is to determine which vocabulary terms are more characteristic of one entity vs. the other. Unfortunately, simply comparing the weights for a vocabulary word will not work, since the popularity of the entities on the web may differ a lot (e.g., "Panda Express" (a nationwide restaurant chain) vs. "Wild Ginger" (a local Seattle restaurant). Thus, the system may first re-normalize the vocabulary term weights for each entity to the same scale, and then perform the comparison.

FIG. 1 is a block diagram that illustrates components of the entity summarization system, in one embodiment. The system 100 includes a content data store 110, a user request component 120, an entity summary component 130, a corpus analysis component 140, a vocabulary weighting component 150, an entity compare component 160, a list normalizing component 170, and a user request component 180. Each of these components is described in further detail herein.

The content data store 110 stores a corpus of content gathered from one or more networks. The content may include web pages, documents, audiovisual content, or any other type of network accessible content. The content data store 110 may include one or more files, file systems, hard drives, storage area networks, cloud-based storage services, or other storage facilities for persisting data. In some embodiments, the system 100 operates in conjunction with an existing search engine that includes a data store for storing a search index and that periodically re-crawls the network to identify new or updated content.

In some embodiments, the content data store 110 also pre-computes and stores an N-gram web model that represents all the content on the web as a set of N-grams, which are sequences of N consecutive words. This is done by pre-processing the web corpus, and creating an N-gram data store, containing a (N-gram, frequency) pair for each N-gram appearing on the web, as well as an index that, similar to a regular search engine index, allows retrieving all the N-grams containing a given set of one or more words. This representation is much more compact than the regular web corpus, since many N-grams repeat very frequently on the web.

The user request component 120 receives user requests to summarize and compare entities. The component 120 may provide a user interface, such as a web page, mobile application, desktop application, or programmatic interface through which users access the system 100 to request a summary of a single entity or a comparison of two or more entities. The user request component 120 receives an identification of the entity, such as through a textual string that includes the entity name or through a set of properties that define the entity. In some cases, the system 100 may be used with other processes that receive an ambiguous indication of an entity (e.g., a query search string) and identify/disambiguate in which entity the user is interested. Such systems may query the entity summarization system 100 with multiple potential entities to get summary information for each of several possibilities. The user request component 120 may also receive a list of vocabulary to match against the entity, or a selection of one or more predefined vocabulary lists (e.g., a system default, or specific lists for restaurants, cars, or other entity types). The component 120 may offer different types of summarizations based on the vocabulary that the user selects, such as a summarization of positive sentiment based on a vocabulary list of positive words, a summary of negative sentiment based on a vocabulary list of negative words, a feature summary based on a vocabulary list of common features, and so on.

For comparisons, the user request component 120 receives an identification of two or more entities similar to the single entity in the summarization case. The component 120 may also receive a vocabulary list as in the summarization case against which the system 100 will compare both entities.

The entity summary component 130 performs an entity summarization by determining a weighted list of relatedness between the entity and each of a provided list of vocabulary words as determined by the corpus in the content data store. For the entity summarization scenario, the input to the system is an entity name and a vocabulary containing the list of terms describing the aspect of the entities in which the requestor is interested. The vocabulary can be either pre-defined or provided by the requestor. Given the input, the system performs matching of the entity name and the vocabulary terms to the content of web pages or other stored content, computing statistics on the occurrences of vocabulary terms in the context of the given entity name. The closer the entity name and a vocabulary term occur in the text, the higher the weight of the match. The result of this step is a weighted list of vocabulary terms describing the entity. The entity summary component 130 invokes the corpus analysis component 140 and vocabulary weighting component 150 to perform the core of the summarization, then invokes the user response component 180 to provide the results to the user.

The corpus analysis component 140 analyzes the corpus of content stored in the content data store to determine a ratio of occurrences of a requested entity and each provided vocabulary word versus the total occurrences of the vocabulary word in the corpus. The corpus analysis component 140 may access N-grams stored in the content data store to quickly determine how frequently the entity name and each vocabulary word occur together. N-grams provide a succinct form of representing web data that allows for faster scanning for terms than a brute force approach of reading every web page.

The vocabulary weighting component 150 assigns a weight to each vocabulary word in the provided vocabulary list based on how frequently each term occurs with the entity name. The weights provide a relative level of comparison between how often the entity name occurs with one term versus another. The component 150 sorts the results to produce a weighted vocabulary list as output that has those words occurring most frequently with the entity name at the top. The resulting words high in the list are those that are most representative of current user sentiment with respect to the entity.

The entity compare component 160 handles entity comparisons by performing an entity summarization on each of two received entities and then comparing a weighted vocabulary list for each entity to determine which entity is more associated with the provided vocabulary list. The entity compare component 160 invokes the list normalizing component 170 to re-normalize the weights between the two entities. This step allows the system 100 to account for quantitative differences in the occurrence of each entity in the corpus of content while maintaining the qualitative differences. The entity compare component 160 may generate visual (e.g., a tag cloud) or other output (e.g., a textual result report) that provides an indication of the result of the comparison.

The list normalizing component 170 normalizes weights resulting from summarizing each of two entities before comparing the entities. The normalization accounts for the possibility that one entity is much more popular or frequent in the corpus of content, and allows for a fair comparison of how users regard each entity that is not biased toward the more frequently occurring entity. The target of the comparison is to determine how well each entity relates to the words in the vocabulary list not to choose which entity is most frequently described in the corpus.

The user response component 180 provides results of the summarization and/or comparison in response to the user request. The component 180 may provide the results visually, such as through a tag cloud, graph, or other graphical display, or in another form such as a test-based report. The component 180 provides results in a form that mirrors that of the request. For example, if the request arrives via Hypertext Transport Protocol (HTTP) as a GET request, then the response may be sent as a standard HTTP 200 OK response with the result data. If the request arrives programmatically via a web services or other interface, then the results are sent in kind.

The computing device on which the entity summarization system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
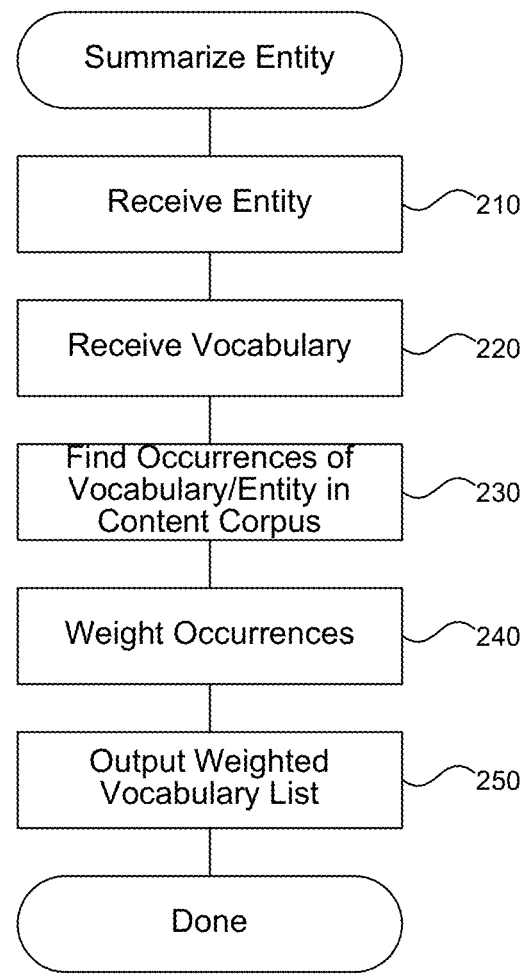
FIG. 2 is a flow diagram that illustrates processing of the entity summarization system to summarize terms associated with an entity that represents a person, place, or thing, in one embodiment.

FIG. 2 is a flow diagram that illustrates processing of the entity summarization system to summarize terms associated with an entity that represents a person, place, or thing, in one embodiment.

Beginning in block 210, the system receives an identification of an entity for which to generate a summary of relatedness to one or more terms. The entity may include any person, place, or thing, which may be a product, concept, brand, service, and so forth. The indication of the entity may include a name (e.g., "Honda Accord") or any other specification of a particular entity to summarize. The system may provide a user interface through which users access the system and the system receives the entity through the user interface. For example, the system may provide a web page through which a user types an entity in a text box and invokes the system to summarize the entity by pressing a button. The system may be implemented as a web page, a mobile application, a desktop application, or numerous other forms.

Continuing in block 220, the system receives an indication of a vocabulary list of terms against which to compare the received identified entity. The system may provide a default vocabulary list for assessing positive or negative sentiment, and may provide targeted vocabulary lists representative of users' sentiment towards particular types of entities, such as restaurants, care companies, Internet providers, shoes, politicians, or any other type of entity. The system may also provide a facility through which users can provide a custom vocabulary list or augment an existing list with additional terms provided by the user. This allows the user to create summaries based on a flexible set of criteria suited to the user's purpose.

Continuing in block 230, the system accesses a corpus of content and determines a frequency with which the identified entity occurs in association with each of the terms of the vocabulary list, producing one frequency per vocabulary list term. The system may search the web, access an index of web content, apply an N-gram model as described herein, or use any other mechanism for determining how frequently the entity name co-occurs with the terms of the vocabulary list. When using the N-gram model, the system determines how many N-grams contain the entity and each vocabulary term versus how many N-grams contain each vocabulary term in total. This leads to a ratio of occurrence of the entity and any particular term (e.g., 5%).

Continuing in block 240, the system assigns a weight to each term in the vocabulary list based on the determined frequency for that term to produce a weighted vocabulary list. The system sorts this list so that the highest weighted (most frequently co-occurring) vocabulary terms are ranked highest. The terms at the highest rank of the list are those that most frequently occur with the entity name. In cases of summarizing to test positive sentiment of a restaurant, these may be terms such as "good food", "clean", "fast", and so forth.

Continuing in block 250, the system provides the weighted list of vocabulary terms in response to the received request. The system may produce a visual display, such as a tag cloud or graph, a textual report, a user interface for further working with the entity (e.g., comparing to other similar entities), and so on. In some embodiments, the system may display the weighted list itself so that users can see which terms are most closely associated with the identified entity, and may allow the user to export the results for further analysis. After block 250, these steps conclude.

Figure 3:
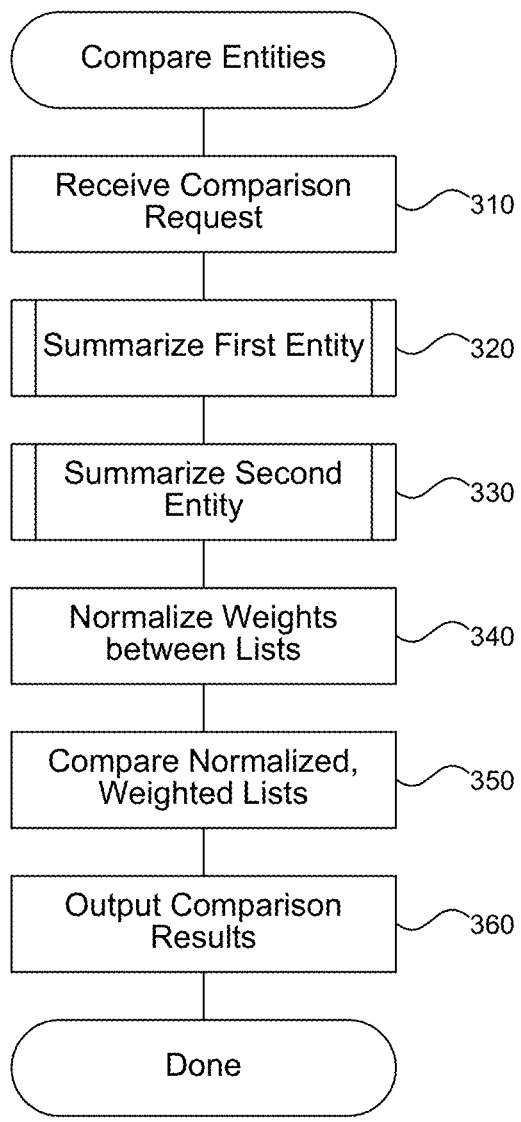
FIG. 3 is a flow diagram that illustrates processing of the entity summarization system to compare sentiment towards to entities that represent persons, places, or things, in one embodiment.

FIG. 3 is a flow diagram that illustrates processing of the entity summarization system to compare sentiment towards to entities that represent persons, places, or things, in one embodiment.

Beginning in block 310, the system receives a request to compare two entities from a user, where the comparison determines a relative level of match between the two entities against a vocabulary list. The system may provide a user interface through which users access the system and the system receives a pair of entities (or more than two) through the user interface. For example, the system may provide a web page or application through which a user types entities in a text box and invokes the system to compare the entities by pressing a button.

The system may be implemented as a web page, a mobile application, a desktop application, or numerous other forms. The system may provide a default vocabulary list for assessing positive or negative sentiment, and may provide targeted vocabulary lists representative of users' sentiment towards particular types of entities, such as restaurants, care companies, Internet providers, shoes, politicians, or any other type of entity. The system may also provide a facility through which users can provide a custom vocabulary list or augment an existing list with additional terms provided by the user.

Continuing in block 320, the system summarizes a first entity of the two entities received in the request, where summarizing produces a first weighted list of vocabulary list items based on a frequency of occurrence of the entity and each list item in a corpus of content. Summarizing each entity is described in further detail with reference to FIG. 2. Continuing in block 330, the system summarizes a second entity of the two entities received in the request, producing a second weighted list of vocabulary list items.

Continuing in block 340, the system normalizes term weights between the first weighted list and the second weighted list. Normalizing eliminates or reduces the effects of heavier occurrence of one entity in the corpus of content than the other entity. The weights are aligned so that even if one entity occurs more frequently, a comparison of the two lists will show which entity is more closely related to the vocabulary list. If the list is one of positive sentiment terms, then this will result in a determination of which entity is regarded more favorably by producers of the content.

Continuing in block 350, the system compares the normalized, weighted vocabulary lists to determine which entity is more closely related to the items in the vocabulary list. In some embodiments, the system determines a score for the comparison so that a user can visualize whether the entities are relatively close in sentiment or whether one entity is dramatically more aligned with the vocabulary list. Because of the custom vocabulary list, this type of comparison can be used to answer a variety of comparative questions between two entities (e.g., which is more fun, which is better liked, which is more trustworthy, and so forth).

Continuing in block 360, the system provides output of a comparison result that indicates an outcome of the comparison. The system may provide the comparison result graphically, such as through a picture, graph, or multimedia display, textually, such as through a report, or in any other form for providing the information to a user. The system may also provide programmatic output to other applications or components that may use the system to perform an intermediate step in a higher-level process. After block 360, these steps conclude.

Figure 4:
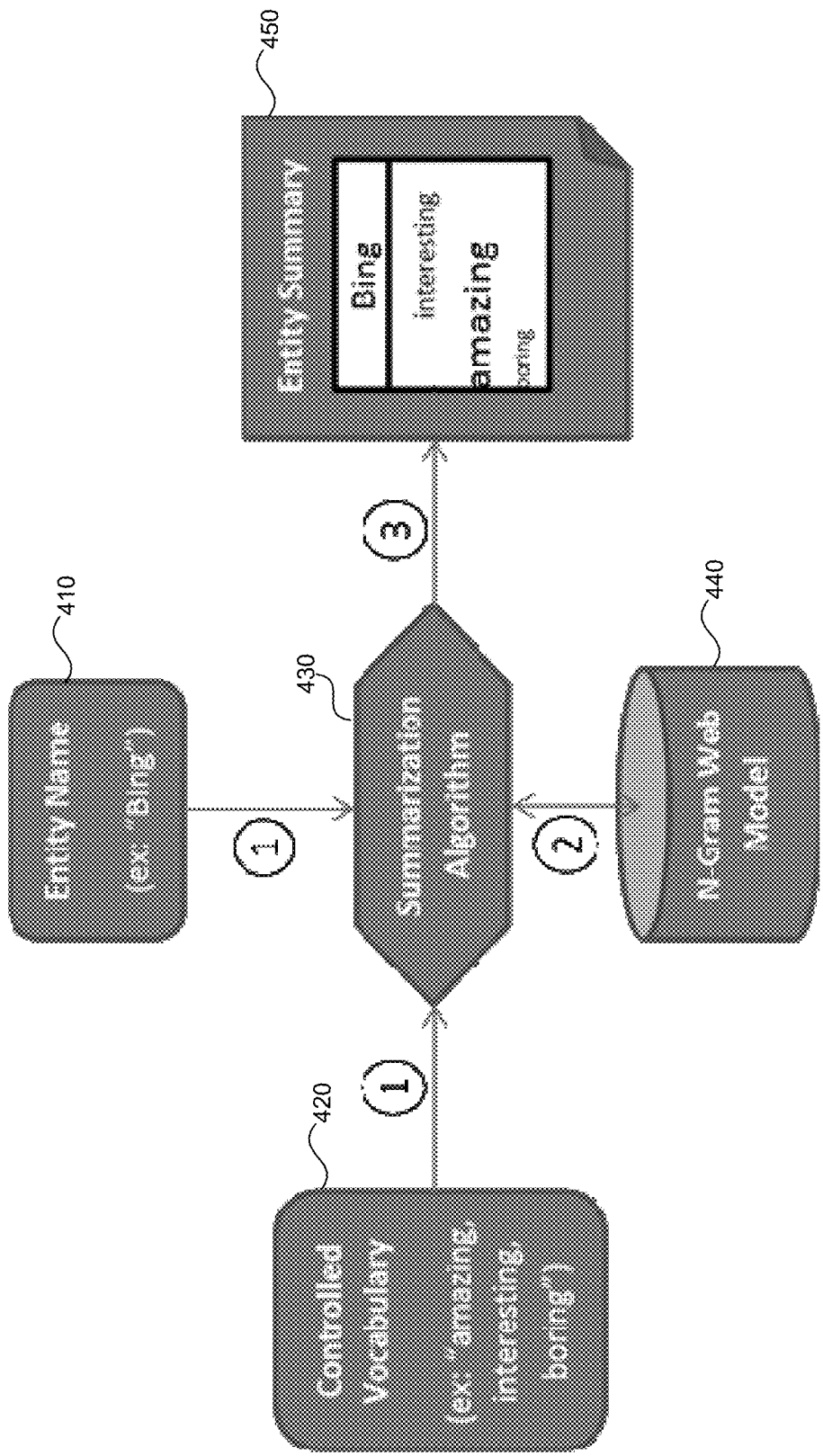
FIG. 4 is a data flow diagram that visually depicts the entity summarization process of the system, in one embodiment.

FIG. 4 is a data flow diagram that visually depicts the entity summarization process of the system, in one embodiment. The system receives data including an entity name 410 and a controlled vocabulary 420. For example, the entity name may be the search engine MICROSOFT™ BING™ and the vocabulary may include positive sentiment words like "amazing" and "interesting". The system applies a summarization process 430 like that described herein which accesses an N-gram web model 440 to determine how frequently the entity name 410 co-occurs with terms in the controlled vocabulary 420. The result is an entity summary 450 shown in the illustration as a tag cloud. Although shown as bidirectional, the connection between the summarization process 430 and N-gram web model 440 may or may not share any data from the summarization process 430 back to the N-gram web model 440. It is possible for the summarization process 430 to provide feedback to the N-gram web model 440 though not common.

Figure 5:
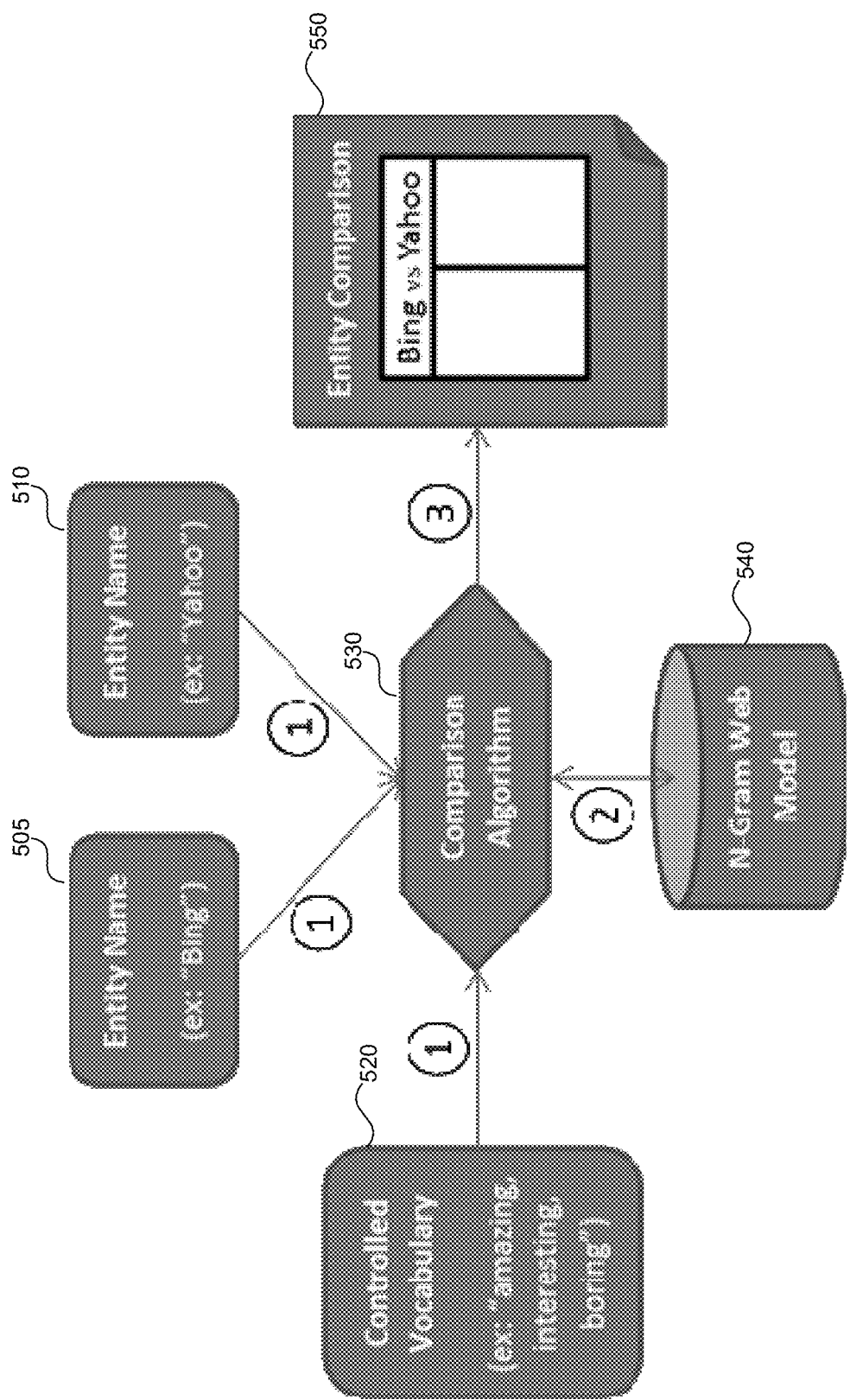
FIG. 5 is a data flow diagram that visually depicts the entity comparison process of the system, in one embodiment.

FIG. 5 is a data flow diagram that visually depicts the entity comparison process of the system, in one embodiment. The system receives data including a first entity name 505, a second entity name 510, and a controlled vocabulary 520. For example, the entity names may be the search engines MICROSOFT™ BING™ and YAHOO!™, and the vocabulary may include positive sentiment words like "amazing" and "interesting". The system applies a comparison process 530 like that described herein which accesses an N-gram web model 540 to determine how frequently each entity name co-occurs with terms in the controlled vocabulary 520. The result is an entity comparison 550 shown in the illustration as a two-column table. Although shown as bidirectional, the connection between the comparison process 530 and N-gram web model 540 may or may not share any data from the comparison process 530 back to the N-gram web model 540. It is possible for the comparison process 530 to provide feedback to the N-gram web model 540 though not common.

In some embodiments, the entity summarization system produces the n-gram model in advance of receiving entity summarization and comparison requests and on an ongoing basis thereafter. For example, the system can crawl the web, throwing out any stop words or other non-informative terms, and produce sequences of words of a selected n-gram length. This can result in enormous savings (e.g., 100×) versus trying to store a full web index. The system may also query for a vocabulary list appropriate for any particular entity summarization and comparison.

In some embodiments, the entity summarization system displays entity comparisons that emphasize differentiating qualities. For example, after generation of the two weighted vocabulary lists, the system may remove parts the two entities have in common and bubble up or highlight those parts where the two entities differ. This allows a user to quickly see the defining characteristics of each entity and their differences. The opposite is also possible where a user is interested in how similar two entities are and wants to see where they match.

From the foregoing, it will be appreciated that specific embodiments of the entity summarization system have been described herein for purposes of illustration, but that various modifications may be made without deviating from the spirit and scope of the invention. Accordingly, the invention is not limited except as by the appended claims.

We claim:

1. A computer system for summarization and comparison of sentiment towards one or more entities, the system comprising:
   a processor and memory configured to execute software instructions embodied within the following components;
   a content data store that stores a corpus of content gathered from one or more networks;
   a user request component that receives user requests to summarize and compare entities;
   an entity summary component that performs an entity summarization by determining a weighted list of relatedness between the entity and each of a provided list of vocabulary words as determined by the corpus in the content data store;
   a corpus analysis component that analyzes the corpus of content stored in the content data store to determine a ratio of occurrences of a requested entity and each provided vocabulary word versus the total occurrences of the vocabulary word in the corpus;
   a vocabulary weighting component that assigns a weight to each vocabulary word in the provided vocabulary list based on how frequently each term occurs with the entity name;
   an entity compare component that handles entity comparisons by performing an entity summarization on each of two received entities and then comparing a weighted vocabulary list for each entity to determine which entity is more associated with the provided vocabulary list; and
   a user response component that provides results of the summarization and/or comparison in response to the user request.

2. The system of claim 1, wherein the content data store operates in conjunction with an existing search engine that includes a data store for storing a search index and that periodically re-crawls the network to identify new or updated content.

3. The system of claim 1, wherein the content data store pre-computes and stores an N-gram web model that represents discovered content on the web as a set of N-grams, which are sequences of N consecutive words.

4. The system of claim 1, wherein the content data store includes a (N-gram, frequency) pair for each N-gram discovered on a network, as well as an index that allows retrieving all the N-grams containing a given set of one or more words.

5. The system of claim 1, wherein the user request component provides a user interface and receives through the user interface one or more entity names.

6. The system of claim 1, wherein the user request component receives a list of vocabulary to match against the entity, or a selection of one or more predefined vocabulary lists.

7. The system of claim 1, wherein the vocabulary weighting component sorts the results to produce a weighted vocabulary list as output that has those words occurring most frequently with the entity name at the top.

8. The system of claim 1, further comprising a list normalizing component that normalizes weights resulting from summarizing each of two entities before comparing the entities.

9. A computer-readable storage medium comprising instructions for controlling a computer system to compare sentiment towards to entities that represent persons, places, or things, wherein the instructions, upon execution, cause a processor to perform actions comprising:
   receiving a request to compare two entities from a user, where the comparison determines a relative level of match between the two entities against a vocabulary list;
   summarizing a first entity of the two entities received in the request so as to yield a first weighted list of vocabulary list items based on a frequency of occurrence of the entity and each list item in a corpus of content;
   summarizing a second entity of the two entities received in the request so as to yield a second weighted list of vocabulary list items;
   normalizing term weights between the first weighted list and the second weighted list so as to compensate for more frequent occurrences of either the first entity or the second entity in the corpus;

comparing the normalized, weighted vocabulary lists to determine which entity is more closely related to the items in the vocabulary list; and providing output as a comparison result that indicates an outcome of the comparison.

10. The computer-readable storage medium of claim 9, wherein, in the normalizing, bias toward a more a frequent occurring one of the entities is removed.

11. The computer-readable storage medium of claim 9, further comprising removing portions of the weighted lists that are common to the entities and highlighting portions of the weighted lists that are not common to the entities.

12. The computer-readable storage medium of claim 9, wherein, in the normalizing, bias toward a more a frequent occurring one of the entities is removed.

13. The computer-readable storage medium of claim 9, further comprising removing portions of the weighted lists that are common to the entities and highlighting portions of the weighted lists that are not common to the entities.

14. A method implemented on a processor, the method comprising:

receiving a request to compare two entities from a user, where the comparison determines a relative level of match between the two entities against a vocabulary list;

summarizing a first entity of the two entities received in the request so as to yield a first weighted list of vocabulary list items based on a frequency of occurrence of the entity and each list item in a corpus of content;

summarizing a second entity of the two entities received in the request so as to yield a second weighted list of vocabulary list items;

normalizing term weights between the first weighted list and the second weighted list so as to compensate for more frequent occurrences of either the first entity or the second entity in the corpus;

comparing the normalized, weighted vocabulary lists to determine which entity is more closely related to the items in the vocabulary list; and providing output as a comparison result that indicates an outcome of the comparison.

\* \* \* \* \*